United States Patent
Muziol

(10) Patent No.: US 6,462,640 B2
(45) Date of Patent: Oct. 8, 2002

(54) SENSOR WITH A TEMPERATURE-DEPENDENT MEASURING ELEMENT

(75) Inventor: Matthias Muziol, Seligenstadt (DE)

(73) Assignee: Heraeus Electro-Nite International N.V., Houlthalen (BE)

( * ) Notice: Subject to any disclaimer, the term of this patent is extended or adjusted under 35 U.S.C. 154(b) by 16 days.

(21) Appl. No.: 09/820,042

(22) Filed: Mar. 28, 2001

(65) Prior Publication Data

US 2001/0026577 A1 Oct. 4, 2001

(30) Foreign Application Priority Data

Mar. 29, 2000 (DE) .......................... 100 15 481

(51) Int. Cl.⁷ ................................................ H01C 7/04
(52) U.S. Cl. ........................ 338/28; 338/25; 374/185
(58) Field of Search ............................. 338/25, 28, 30; 374/185, 209

(56) References Cited

U.S. PATENT DOCUMENTS

| | | | | |
|---|---|---|---|---|
| 2,609,406 A | * | 9/1952 | Barsy ........................ | 338/28 |
| 2,780,703 A | * | 2/1957 | MacIntyre .................. | 338/28 |
| 3,147,457 A | * | 9/1964 | Gill et al. .................... | 338/28 |
| 4,087,775 A | * | 5/1978 | Mackenzie et al. .......... | 338/28 |
| 4,291,576 A | * | 9/1981 | Deane ....................... | 374/155 |
| 4,442,420 A | * | 4/1984 | Novak ......................... | 338/34 |
| 4,538,927 A | | 9/1985 | Jochemczyk et al. | |
| 4,717,787 A | | 1/1988 | Freppon et al. | |
| 5,131,759 A | * | 7/1992 | Eiermann et al. ........... | 374/208 |

FOREIGN PATENT DOCUMENTS

| | | |
|---|---|---|
| DE | 1 473 279 | 11/1968 |
| DE | 28 06 193 A1 | 8/1979 |
| DE | 33 00 733 A1 | 7/1984 |
| DE | 195 37 431 A1 | 4/1997 |
| GB | 996748 | 6/1965 |
| GB | 2 223 100 A | 3/1990 |
| JP | 59-210333 A | 11/1984 |

\* cited by examiner

*Primary Examiner*—Karl D. Easthom
(74) *Attorney, Agent, or Firm*—Akin, Gump, Strauss, Hauer & Feld, L.L.P.

(57) ABSTRACT

A sensor for temperature measurements has a temperature-dependent measuring element, which is arranged in one end of a quartz glass tube facing the measurement, wherein a connection line of the measuring element is guided to the outside through the other end of the quartz glass tube. The quartz glass tube is itself surrounded by a protective tube made of stainless steel, which is closed off at its end facing the measurement by a rotationally symmetric formed body, preferably a sphere made of stainless steel. A spacer made of electrically insulating material, preferably mica, is provided between the formed body or sphere and the measuring element.

8 Claims, 2 Drawing Sheets

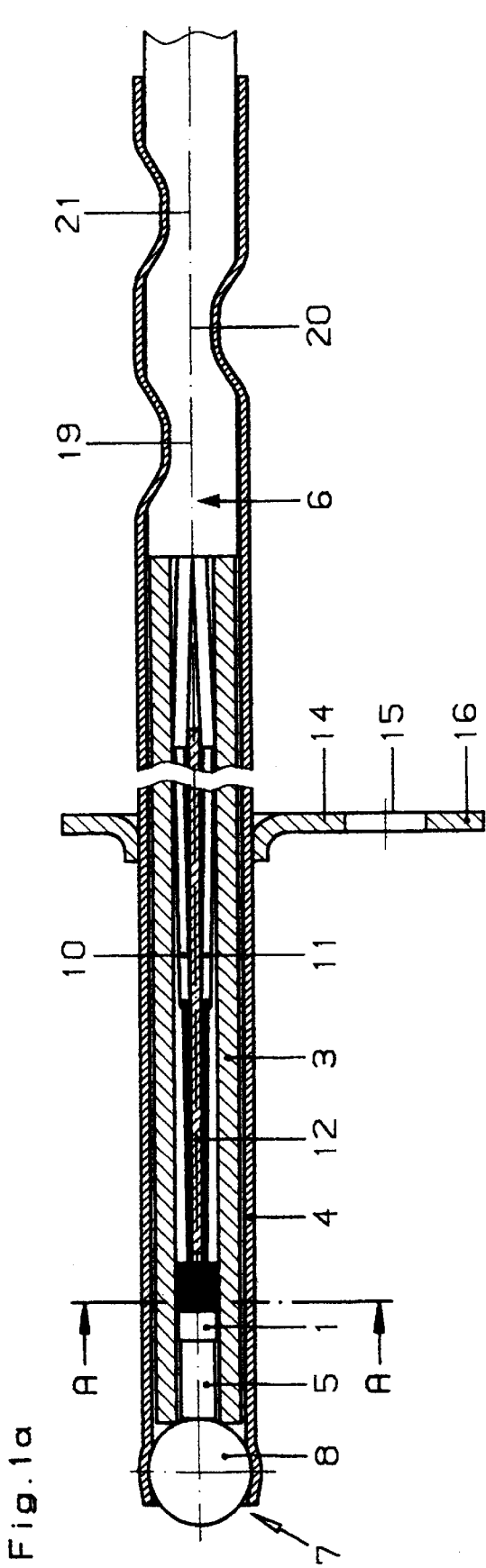
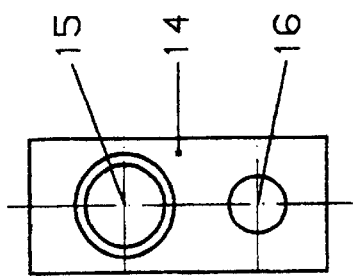
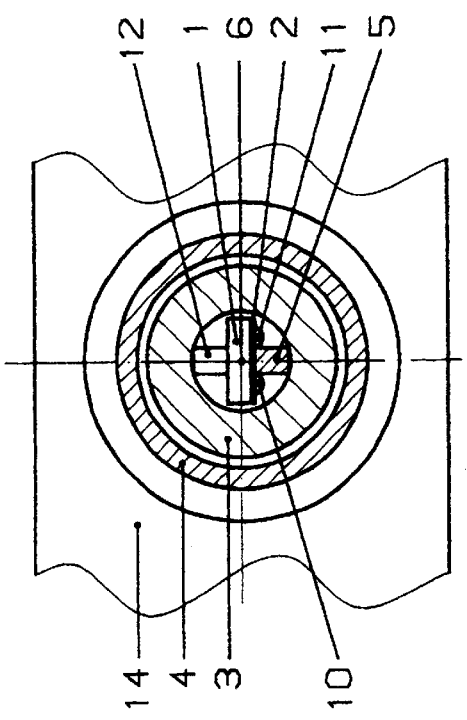
Fig. 1a
Fig. 1b
Fig. 1c

SENSOR WITH A TEMPERATURE-DEPENDENT MEASURING ELEMENT

BACKGROUND OF THE INVENTION

The invention relates to a sensor with a temperature-dependent measuring element for temperature measurement, which is arranged in the interior of one end of a quartz glass tube, which faces the measurement, wherein a connection line of the measuring element is guided to the outside through the other end of the quartz glass tube.

From British patent specification GB 22 23 100 A, a high-temperature platinum resistance thermometer is known, in which a platinum coil is arranged as a measuring element in the closed end of a quartz tube. It has proven to be problematic that there is the possibility of an eventual contamination of the platinum sensor by the migration of metal vapor through the quartz wall of the sheathing tube. Furthermore, a quartz sheathing of sensors is considered to be susceptible to mechanical damage during robust usage in ovens, e.g., in household baking ovens.

Furthermore, from U.S. Pat. No. 4,538,927 a temperature sensor is known, which has as the outer sheathing a sleeve made of stainless steel with a thin wall thickness, which is closed off with a cap on the end facing the measurement. In the interior of the sheathing a mounting body made of plastic foam is provided, which not only functions for holding a measuring probe, but also functions for a convection interruption between the measuring probe and the end of the temperature sensor facing the cap. The relatively low heat resistance of the plastic foam in a range up to 140° C. has proven to be problematic, so that use in ovens and/or household baking ovens is not possible.

Furthermore, from German published patent application DE-OS 1 473 279 a protective tube arrangement is known for rapid immersion measurement of a molten metal, in particular for measuring the casting temperature of molten iron, steel or the like, in which a protective tube element made of a heat-resistant material, in particular quartz, is provided with a thin wall thickness and a small outer diameter and, furthermore, with a closed off end, which has, in the interior of the closed end, a measuring element for the temperature measurement of the melt. In addition, a sheathing tube element made of a heat-insulating, non-combustible material, preferably quartz, is provided, which encloses the largest part of the length of the protective tube element with the exception of its closed end. Furthermore, a carrier tube element is provided as a holder in a manner known per se, which is shoved onto the sheathing tube element and, to be precise, on the end piece turned away from the closed end of the protective tube. A ring-shaped intermediate space located between the protective tube element and the sheathing tube element is preferably filled with a powder made of a heat-insulating, heat-resistant material. The relatively complex construction has proven to be problematic in a protective tube arrangement of this type.

From U.S. Pat. No. 4,717,787 a thermoelement is known for rapid temperature recording and defense against interference signals during the temperature measurement in vacuum ovens, wherein the protective tube is made of quartz glass and has a grounded metal wire wound around it. The winding with the grounded metal wire protects the thermoelement from electric interference effects in the oven space, without the radiation permeability of the protective tube being impaired. As wire materials, chromium-nickel, molybdenum and platinum have proven useful, depending on the temperatures of use. This also involves a relatively complex arrangement.

BRIEF SUMMARY OF THE INVENTION

An object of the invention is to create a cost-effective sensor for temperature measurement, in particular in baking ovens for baking and cooking operations, whose insulation is largely voltage-stable. The temperature range provided for measurement therein should lie in a range of −40° C. to 550° C.

The object is achieved according to the invention in that the quartz glass tube is surrounded by a protective tube made of metal, which is closed off at its end facing the measurement with a rotationally symmetric formed body, wherein a spacer made of electrically insulating material is provided between the formed body and the measuring element. Advantageous embodiments of the invention are set forth below and in the dependent claims.

In a preferred embodiment of the invention, the rotationally symmetric formed body is pressed into (friction-set in) the open end of the protective tube and is thereby held form-fittingly. In an especially advantageous embodiment of the invention, the rotationally symmetric formed body is constructed as a sphere. However, it is also possible, for example, to use an ellipsoid or a cone-shaped body as a rotationally symmetric formed body. In an advantageous manner, the protective tube as well as the sphere are both made of stainless steel. As a stainless steel sphere, preferably a sphere according to DIN 5401, Workpiece 1.4034/1.3541 is used.

As the measuring element, preferably a platinum thin-layer resistor is used, whose connection lines are welded on and are electrically insulated from each other inside the quartz glass tube by a longitudinally extending intermediate connecting piece. Advantageously, the intermediate connecting piece also functions for the form-fit mounting of the measuring element. Both the spacer between the formed body or the sphere and the measuring element, as well as the intermediate connecting piece, are preferably made of mica.

It has proven to be advantageous that manufacturing and marking of a complete protective tube as well as the lock-beading of the connection cable in the protective tube are possible in a single work operation. Further, it has proven to be advantageous that the connection cable is continuous from the connection plug up to the measuring element without additional connection points.

Furthermore, a quartz glass tube may be manufactured in a relatively cost-effective manner. In addition, the use of quartz glass ensures the electrical insulation of the temperature sensor from the oven power supply, especially at higher temperatures. The voltage stability or the insulation between the electrical conductors and the protective tube is so high that, for example, when a voltage of 3000V is applied, no voltage arc-over occurs.

When using mica strips, it has proven to be advantageous that they are not very sensitive to breaking, and the mounting can be done radially, so that no insulation parts are threaded, which would then stand in the way when forming the connection point of the measuring element/connection line. The mica strip has the further advantage that it ensures an insulation separation distance from the formed body or from the metal sphere by a saving in the length of the measuring element and by the overhang forwardly beyond the measuring element.

A further advantage can be seen in the fact that a formed body constructed as a stainless steel sphere can be processed in an especially easy manner, since the sphere need not be exactly oriented in its position within the opening of the protective tube prior to its assembly.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings:

FIG. 1a is a schematic representation of the temperature sensor in longitudinal section, shown partially broken away;

FIG. 1b is a schematic cross-section along the cross-sectional plane indicated symbolically by the line A—A, wherein the sectional plane is shown rotated by 90° around the longitudinal axis;

FIG. 1c is a mounting arrangement for the temperature sensor in a schematic front view;

DETAILED DESCRIPTION OF THE INVENTION

Figure 2:
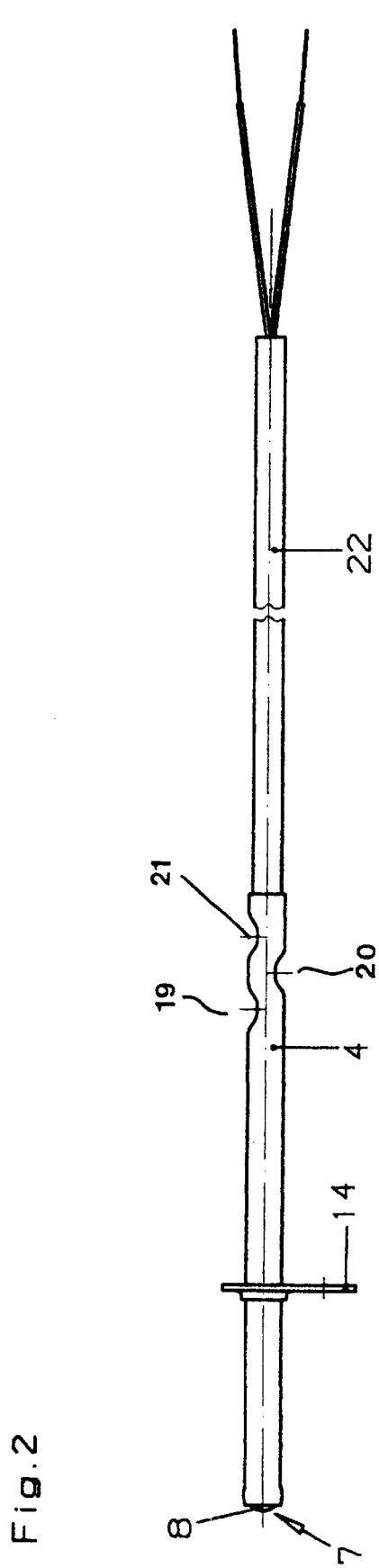
FIG. 2 is a schematic view of the temperature sensor, shown partially broken away, with the connected cable in a longitudinal side view.

According to FIG. 1a, a measurement resistor functioning as a measuring element is surrounded by a quartz glass tube 3, which is itself arranged in a protective tube 4 made of stainless steel. The measuring element 1 is arranged in the quartz glass tube 3 in a form-fit manner with the help of an electrically insulating spacer 5 and an intermediate connecting piece 12, wherein the spacer 5 is constructed as a mica strip along the longitudinal axis 6 of the protective tube 4.

In the end region 7 of the protective tube 4 which faces the measurement, a stainless steel sphere constructed as a rotationally symmetric formed body 8 is pressed into the protective tube opening, wherein the sphere is contiguous with the opening of the quartz glass tube 3 and seals off the opening of the protective tube 4 in a gas-tight manner. On account of the pressing-in operation, it is thus held form-fittingly in the end region 7 of the protective tube 4.

The measuring element 1 is provided on its end facing away from the measurement with connection lines 10, 11, which are respectively insulated from each other by an intermediate connecting piece 12 made of an electrically insulating material. In a preferred embodiment, the intermediate connecting piece 12, just as the spacer 5, is constructed as a mica strip. Furthermore, it is also possible to construct the intermediate connecting piece 12 together with the spacer 5 from a continuous mica strip.

During the construction of the temperature sensor, it has proven to be especially advantageous that the sphere made of stainless steel as a formed body 8 does not have to be positioned exactly prior to its mounting in the opening end region 7 of the protective tube 4, i.e., prior to the pressing-in operation, since it is practically automatically centered in the hollow cylindrical opening because of its spherical shape. Here, it has proven especially advantageous that a later welding operation with subsequent cleaning of the welding seam can be omitted, whereby then also no more sharp edges can occur. The original tube diameter is only slightly enlarged in the tube end region by the stainless steel sphere as a formed body 8, wherein here a standard sphere according to DIN 5401; Workpiece 1.4034/1.3541 is used.

According to FIG. 1a the protective tube 4 is arranged in a planar-shaped mounting 14, which makes possible an attachment to an end 7 of the protective tube 4 facing the spatial measurement region. Thus, for example, the mounting 14 can be attached to a rear wall of a baking oven, wherein the temperature sensor projects through an opening of this wall into the interior of the oven with one part of the protective tube 4 and the end 7 facing the measurement or the item to be heated.

In FIG. 1a, pinched regions 19, 20, and 21 for attaching a connection cable can also be recognized, as is explained in greater detail below based on FIG. 2.

It proves to be especially advantageous that the temperature sensor according to the invention is also suitable for voltage-stable applications, in which the customary voltage values, for example 220V/380V of the household power supply, can be considerably exceeded.

According to the cross-sectional view in FIG. 1b (rotated by 90°), the measuring resistor as measuring element 1 is arranged on the spacer 5 as a mica strip, wherein the measuring element 1 and mica strip are surrounded together by the quartz glass tube 3. In the background can be recognized a part of the intermediate connecting piece 12 which, in conjunction with the spacer 5 and the inner wall of the quartz glass tube 3, provides for a form-fit mounting of the measuring element 1. The quartz glass tube 3 is in turn surrounded by the protective tube 4 made of stainless steel, wherein in the background of the cross-sectional surface along the line A—A according to FIG. 1a can also be recognized a part of the mounting 14, shown broken away.

In FIG. 1c the complete mounting 14 is shown, wherein the opening 15 functions for passing through and holding the protective tube 4, while the opening 16 functions for attachment in the wall area (e.g., rear wall) of an oven or a treatment room to be temperature controlled.

From FIG. 2 can be recognized the gas-tight seal by means of the stainless steel sphere 8 constructed as a formed body 8 in the end region 7 of the protective tube 4, wherein in the region facing away from the measurement, the protective tube 4 has pinched regions 19, 20, 21 with which a connection cable 22 for transmitting measurement signals from the measuring element 1 is held for the connection lines 10, 11 shown in FIG. 1a. The connection cable 22 is connected to a measurement and control device (not shown here). Further in FIG. 2, the mounting 14 described in FIG. 1c can be recognized.

Figure 3:
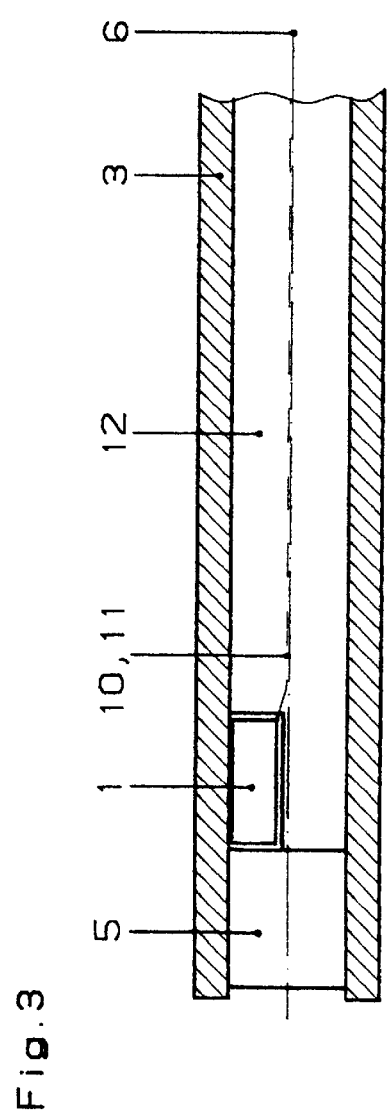
FIG. 3 is a schematic longitudinal section through the sensor element, as well as the spacer, intermediate connecting piece and quartz glass tube.

In FIG. 3, the form-fit mounting of the measuring element 1 is illustrated schematically. In this special form the measuring element 1 rests in a cutout of the intermediate connecting piece 12, which electrically insulates the connection lines connected to the measuring element 1 from each other (connection lines are not shown here for better clarity). The measuring element 1 is here held immovably by the intermediate connecting piece 12 and the spacer 5, as seen in the axial direction, and by the recess of the intermediate connecting piece 12 and the inner wall of the quartz glass tube 3, as seen in the radial direction.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A sensor comprising a temperature-dependent measuring element (1) for temperature measurement, the measuring element (1) being arranged in an interior of a first end (7) of a quartz glass tube (3) facing the measurement, connection lines (10, 11) of the measuring element (1) being guided outside through a second end of the quartz glass tube (3), the quartz glass tube (3) being surrounded by a protective tube (4) made of metal, which is closed off at its first end (7) with a rotationally symmetric formed body (8), and a spacer (5) made of electrically insulating material being provided between the rotationally symmetric formed body (8) and the measuring element (1).

2. The sensor according to claim 1, wherein the rotationally symmetric formed body (8) is pressed in and held form-fittingly in the end (7) of the protective tube (4).

3. The sensor according to claim 1, wherein the rotationally symmetric formed body (8) is constructed as a sphere.

4. The sensor according to claim 1, wherein the spacer (5) is made of mica.

5. The sensor according to claim 1, wherein the protective tube (4) is made of stainless steel.

6. The sensor according to claim 1, wherein the rotationally symmetric formed body (8) is made of stainless steel.

7. The sensor according to claim 1, wherein a platinum thin-layer resistor is used as the measuring element (1), whose connection lines (10, 11) are electrically insulated from each other within the quartz glass tube (3) by a longitudinally extending intermediate connecting piece (12).

8. The sensor according to claim 7, wherein the intermediate connecting piece (12) is made of mica.

* * * * *